United States Patent [19]
Bos et al.

[11] Patent Number: 5,439,099
[45] Date of Patent: Aug. 8, 1995

[54] CONVEYOR MAT BUILT UP OF SYNTHETIC MODULES AND MODULES FOR SUCH CONVEYOR

[75] Inventors: A. J. L. Bos, 's-Gravenzande; C. P. M. Vermeulen, Rotterdam, both of Netherlands

[73] Assignee: MCC Nederland B.V., Netherlands

[21] Appl. No.: 153,600

[22] Filed: Nov. 16, 1993

[30] Foreign Application Priority Data

Nov. 16, 1992 [NL] Netherlands .................... 9201999

[51] Int. Cl.$^6$ ............................................. B65G 17/06
[52] U.S. Cl. ................................................. 198/853
[58] Field of Search ...................... 198/851, 852, 853; 474/220, 223, 224, 225

[56] References Cited

U.S. PATENT DOCUMENTS

| | | | |
|---|---|---|---|
| 3,870,141 | 3/1975 | Lapeyle et al. | 198/853 |
| 4,709,807 | 12/1987 | Poerink | 198/853 |
| 4,832,187 | 5/1989 | Lapeyre | 198/851 |
| 4,893,710 | 1/1990 | Bailey et al. | 198/853 |
| 4,993,544 | 2/1991 | Bailey et al. | 198/853 X |
| 5,020,656 | 6/1991 | Faulkner | 198/853 X |
| 5,125,504 | 6/1992 | Corlett et al. | 198/853 X |
| 5,156,264 | 10/1992 | Lapeyre | 198/852 |
| 5,217,110 | 6/1993 | Sprangler et al. | 198/852 |
| 5,247,789 | 9/1993 | Abbestam et al. | 198/851 X |
| 5,293,989 | 3/1994 | Garbagnati | 198/851 X |
| 5,303,818 | 4/1994 | Gruettner et al. | 198/853 X |
| 5,305,869 | 4/1994 | Damkjaer | 198/853 X |

FOREIGN PATENT DOCUMENTS 0288409  10/1988  European Pat. Off. .
0493349  7/1992  European Pat. Off. ............. 198/853

*Primary Examiner*—Joseph E. Valenza
*Attorney, Agent, or Firm*—Varnum, Riddering, Schmidt & Howlett

[57] ABSTRACT

A conveyor mat built up of first and second modules, made in one piece of synthetic material, the width of the first modules being substantially twice the width of the second modules, with the modules, viewed in the longitudinal direction of the mat, being staggered, each module consisting of a plurality of substantially equally spaced-apart hinge plates, each extending over substantially the entire length of the module and each having hinge loops at the two ends thereof, the hinge plates of a module being coupled by at least one rib disposed between the two ends, the ends of the hinge plates being disposed at a longitudinal side of a module between the ends of the hinge plates of an adjacent module in the longitudinal direction of the mat, the hinge loops of the two modules being substantially in alignment and coupled to each other by a hinge pin extending through the hinge loops, the second modules are located exclusively on the two lateral sides of the conveyor mat, a first module always being disposed between two consecutive second modules at one lateral side, and the first and second modules have such a width that at the lateral sides of the mat, the end faces of the first modules and second modules are substantially in line.

22 Claims, 8 Drawing Sheets

CONVEYOR MAT BUILT UP OF SYNTHETIC MODULES AND MODULES FOR SUCH CONVEYOR

BACKGROUND OF THE INVENTION

The invention relates to a conveyor mat built up of first and second modules, made in one piece of synthetic material, the width of the first modules being substantially twice the width of the second modules, with the modules, viewed in the longitudinal direction of the mat, being staggered, each module consisting of a plurality of substantially equally spaced-apart hinge plates, each extending over substantially the entire length of the module and each having hinge loops at the two ends thereof, the hinge plates of a module being coupled by means of at least one transverse rib disposed between the two ends of those hinge plates, the ends of the hinge plates being disposed at a longitudinal side of a module between the ends of the hinge plates of an adjacent module in the longitudinal direction of the mat, the hinge loops of the two modules being substantially in alignment and coupled to each other by means of a hinge pin extending through the hinge loops, there being provided means for locking the hinge pin relatively to the modules.

Such a conveyor mat, built up of modules, is disclosed in U.S. Pat. No. 3,870,141 and is for instance used in the packaging industry, in bottling plants and the like, wherein the mat may have a relatively large width, up to some meters, and be designed as an endless conveyor mat, which at the beginning and the end of a conveying path is guided over sprocket wheels arranged across the width of the conveyor.

In practice, it is often desired that separate conveyor mats can run side by side so as to form a conveying surface. The juxtaposed mats may have the same speed, but may also have different speeds. To ensure a trouble-free conveyance in such a case, the transition from one mat to an adjacent mat should exhibit as few interruptions of the conveyor surface as possible, and the lateral side of each of the mats should be as flat as possible to enable longitudinal movement of the mats relative to each other. The known mat does not meet this requirement, because the hinge pins by which the modules are coupled to each other have a head projecting from the lateral side of the mat, so that in the case of juxtaposed mats, the heads of the hinge pins of adjacent mats may get caught one behind the other, while the conveying surface formed by adjoining mats also exhibits undesired irregularities.

It is observed that European Patent Document 0288409 discloses a conveyor mat which modules are staggered relative to each other and wherein the end hinge plates of the modules disposed at the lateral sides of the mat are designed such that they lie in one line with each other, in order that the mat has a flat lateral side. The hinge pins are locked by means of a cap-shaped locking member axially disposed in the hinge pin opening of each end hinge plate, which locking member is fixed by clicking it by a thickened end thereof behind the inwardly directed side of the end hinge plate. Such caps have the drawback that they cannot readily be removed and easily come loose under the influence of forces exerted through the hinge pins in axial direction. Moreover, a cap only locks one hinge pin and not, as in the invention, two hinge pins at the same time. However, the major drawback of this known conveyor mat is that it is built up of five different types of modules. Using five different types of modules for one type of mat renders the assembly of the mat troublesome and labor-intensive, with a substantial chance of mistakes, and is costly because five different types of modules should be held in store.

It is further observed that U.S. Pat. No. 4,893,710 discloses a conveyor mat of the "raised rib" type wherein a hinge pin is locked by a plate-shaped locking member which can be inserted into a slot-shaped opening formed in the last hinge plate of a module disposed at the lateral side of the mat, the side face of the plate-shaped part being provided with a cam-shaped thickening which engages the hole of the hinge pin by means of a click connection. This known mat has as a drawback that each module disposed at the lateral side of the mat comprises a locking member for a hinge pin, so that the hole must be built up of five different modules, which renders the composition of a mat laborious with much chance of mistakes. A further drawback is that at the location of the plate-shaped locking means the conveying surface is interrupted and that the conveyor mat has no flat lateral side, because the portion of the end hinge plate of a module disposed at the lateral side of the mat, in which portion the locking elements have been provided projects laterally from the rest of that hinge plate.

SUMMARY OF THE INVENTION

One object of the invention is to provide a conveyor mat which does not have the aforementioned drawbacks of the known mat and of which the lateral edge does not have any projecting parts, while also in the case of adjacent mats the conveying surface remains of a completely regular structure.

A further object of the invention is to provide a conveyor mat that can be built up, preferably automatically, from only two different types of modules with as few operations as possible and with a minimum chance of mistakes.

Finally, an object of the invention is to provide a conveyor mat whose modules have the lightest possible construction, which is advantageous for the required drive power for the mat and for the cost price, while the modules of the mat still have a great strength and in particular define a conveying surface which is closed as regularly as possible, which is advantageous for trouble-free longitudinal and transverse movement over the mat of products to be conveyed.

To this end, the invention provides a conveyor mat of the above-mentioned type, characterized in that the second modules are located exclusively on the two lateral sides of the conveyor mat, a first module always being disposed between two consecutive second modules in the longitudinal direction of the mat, that of each second module, the end hinge plate disposed at the lateral side of the mat comprises means for locking the two hinge pins that couple this second module to both first modules adjoining in the longitudinal direction of the mat, and that the first and second modules have such a width that at the lateral sides of the mat, the end faces of the first and second modules are substantially in line.

A first embodiment of the conveyor mat according to the invention is characterized in that each first module has an odd number of hinge plates and the middle hinge plate of a first module is designed as a double hinge plate, which is substantially twice as wide as the other hinge plates of the first and second modules. Preferably, in this embodiment, the hinge plates of a module are coupled by two ribs extending parallel to each other, while between the ribs of a module a space is left for receiving the teeth of a drive wheel. In the case where this first embodiment of the conveyor mat is of the so-called "raised rib" type, it is further characterized in that each hinge plate of a module comprises a first plate-shaped part, extending upwards in the plane of that hinge plate over substantially the entire length thereof, with the top sides of the first plate-shaped parts forming a conveying surface, and in that on both sides of each hinge plate, with the exception of the end hinge plates of the second modules, which end hinge plates are disposed at the lateral side of the mat, a second plate-shaped part is provided which extends parallel to the first plate-shaped part of that hinge plate over substantially the distance between the two ribs and which is coupled to both ribs of the module and whose top side lies substantially in one plane with the top side of the first plate-shaped parts.

The invention also provides a first or a second module intended for a conveyor mat according to the invention.

To further reduce the number of parts necessary for composing a conveyor mat from the two types of modules, a preferred embodiment of the conveyor mat according to the invention is characterized in that the means for locking the two hinge pins extending through a second module consist of a plate-shaped locking member, which, in side view, is n-shaped and whose legs have each been slid into slots extending in the end hinge plate of the second module at the lateral side of the mat transversely relative to each of the two hinge pins, which legs are provided with means for being detachably clicked onto a longitudinal end of a slot.

In the case of a conveyor mat of the "raised rib" type, this offers the possibility of keeping the top face of the mat closed as regularly as possible, because the top side of the n-shaped part is part of the conveyor surface of the mat. Also in the case of mats of the "flush grid" or "flat top" types, such an n-shaped locking member has great advantages, as in one operation, viz. the disposition of the locking member, two hinge pins are locked at the same time. Such an n-shaped member is also easy to remove, for instance by placing a screw driver below the middle part of the "n". Naturally, it also remains possible to lock each of the hinge pins in the end hinge plate of a second module by means of two separate locking members.

BRIEF DESCRIPTION OF THE DRAWINGS

The invention will be explained in more detail hereinafter on the basis of exemplary embodiments with reference to the accompanying drawings. In these drawings:

FIG. 3 shows a section taken on the line III in FIGS. 1a and 2a.

FIG. 5a shows a section taken on the line V—V in FIG. 2a.

DETAILED DESCRIPTION

Figure 1A:
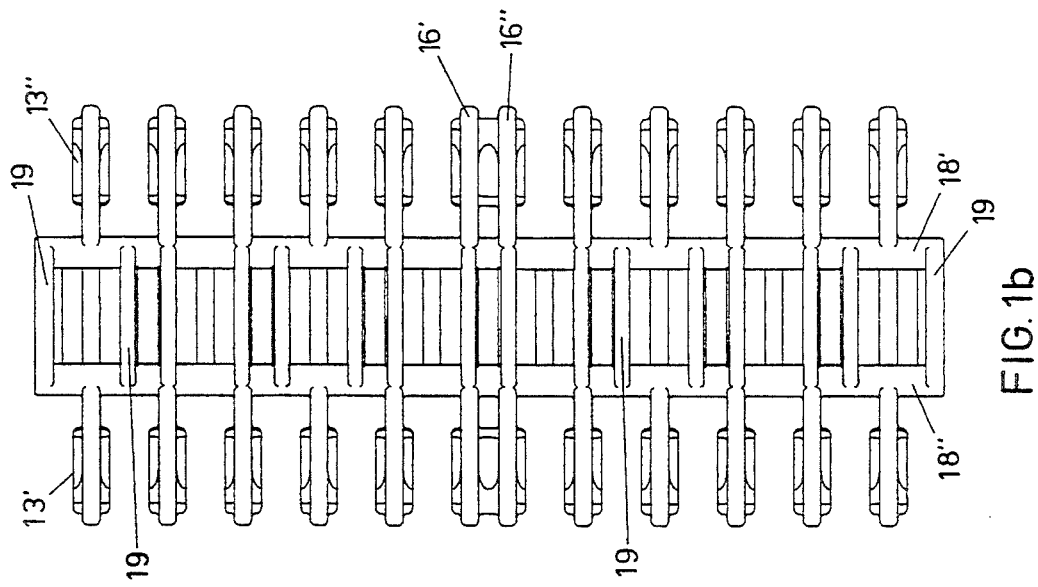
FIGS. 1a–d respectively show a top plan view, a bottom view, a side view and an end view of a first module intended for a first embodiment of the conveyor mat according to the invention.
Figure 1B:
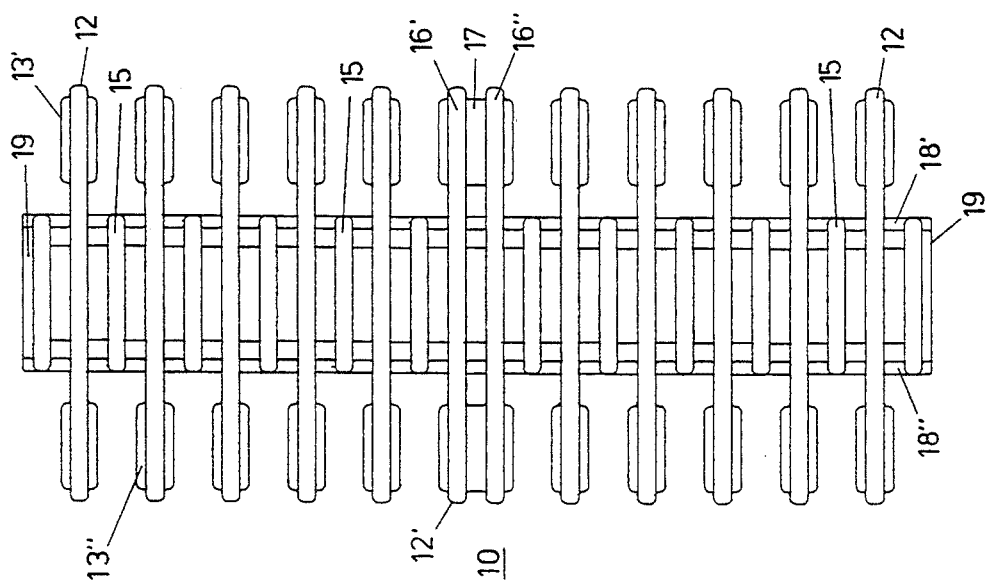
Figure 1D:
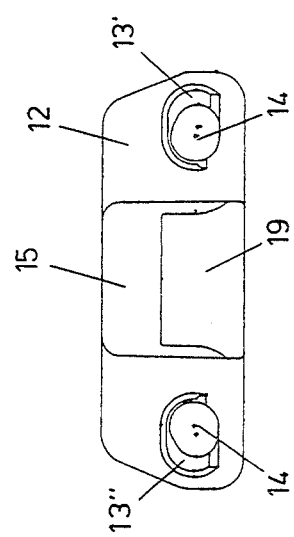
Figure 1C:
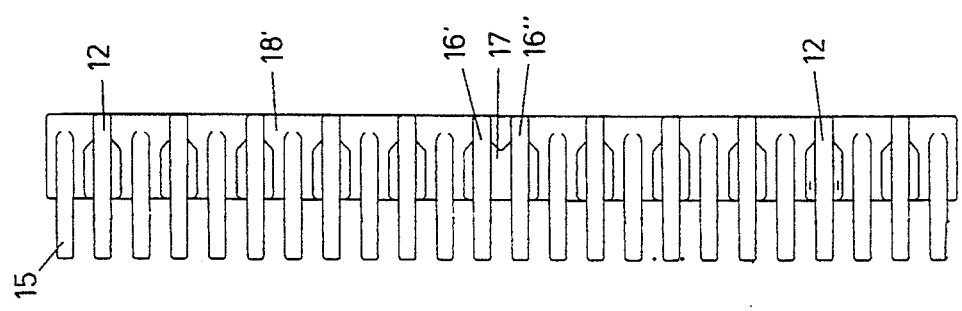
Figure 2A:
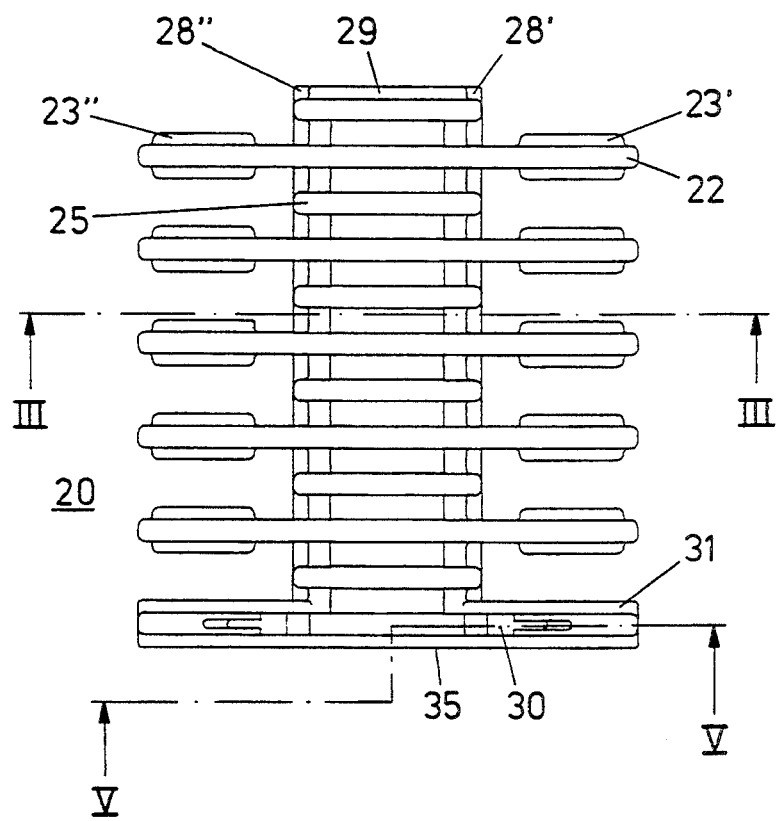
FIGS. 2a–c respectively show a top plan view, a bottom view and a side view of a second or end module for the first embodiment of the conveyor mat.
Figure 3:
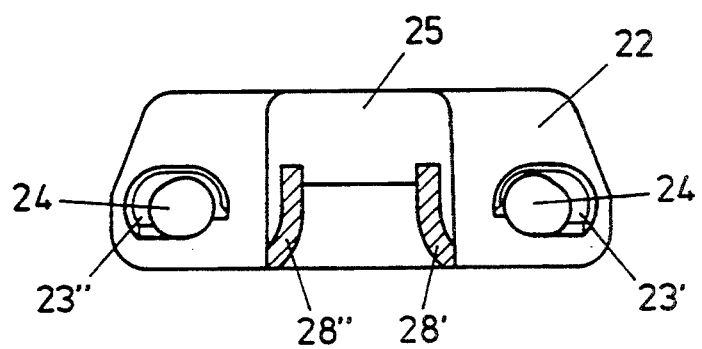
Figure 2B:
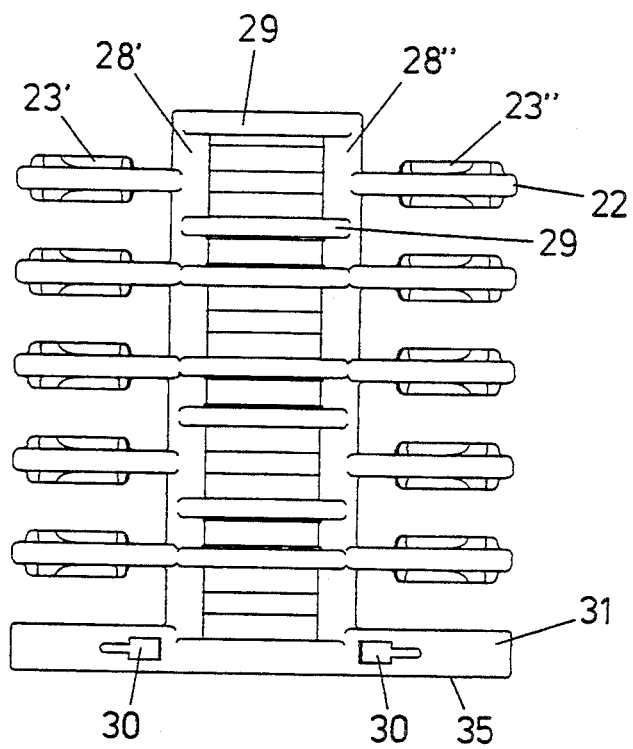
Figure 2C:
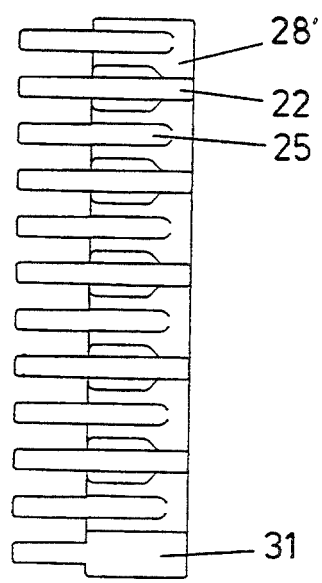

FIGS. 1 and 2 show an embodiment of, respectively, a first and a second or end module for a conveyor mat according to the invention, which mat is of the so-called "raised rib" type. However, it is pointed out expressly that the advantages of the conveyor mat according to the invention will also be maintained if the mat is of the so-called "flush grid" or "flat top" type, wherein, respectively, the modules of the mat do not comprise upright plate-shaped parts for supporting products to be conveyed or comprise an entirely closed top face.

In FIGS. 1 and 2, similar parts are designated by the same reference numerals, however in FIG. 1 they are preceded by the number 1 and in FIG. 2 by the number 2. The first and second modules, respectively 10 and 20, are each of a one-piece construction and are manufactured by means of, for instance, injection moulding. The modules each comprise a plurality of substantially identical hinge plates, 12 and 22, equally spaced apart and each hinge plate on both ends on both sides of the body of the hinge plate having thickened hinge loops 13', 13" and 23', 23", wherein an opening 14 or 24 for a hinge pin is formed. The hinge loops and openings are configured such that all openings of the modules are in alignment, also when the hinge plates of two adjacent modules in longitudinal direction of the mat mesh with each other because the hinge plates of a module are always disposed between the hinge plates of the other module. In this manner, the width of a module is determined by the number of hinge plates of which it consists and the length of a module by the length of a hinge plate.

Provided on both sides of the hinge plates of a module, always equally spaced therefrom, is a plate portion 15 or 25, serving to create in a mat built up of first and second modules a conveying surface that is closed as regularly as possible having a construction that is as light as possible, which is important for a slight drive power needed and for a low cost price.

The first module has an odd number of hinge plates, the middle hinge plate, in the drawing designated by the reference numeral 12', being designed as a double hinge plate which is substantially twice as wide as the other hinge plates. The hinge plate 12' comprises two plate portions 16' and 16", both provided, in the same manner as the hinge plates 12, with hinge loops and openings for hinge pins, but wherein the hinge loops, facing each other, on both sides of the plate-shaped portions 16' and 16" form a single, double hinge loop 17.

The hinge plates 12 and 12' and the plate portions 15 in a first module and the hinge plates 22 and the plate portions 25 in a second module are interconnected and are equally spaced by two transverse ribs, respectively 18', 18" and 28', 28". These ribs also form a contact area for the sprocket wheels driving the mat. As the drive of a conveyor mat does not form a part of the invention and is also well-known to skilled persons, it is not further shown in the drawing. For the sake of completion, it is observed that there are also mats wherein each module has only one transverse rib for driving the mat. Such modules can be manufactured according to the principle of the invention as well.

As shown in FIGS. 1b and 2b, at the bottom side of the first and the second modules, there may be provided additional transverse ribs 19 and 29 respectively, for reinforcement of the modules, these ribs lying in one plane with a plate portion 15 or 25 between the ends of a module, and at the ends of a module being somewhat staggered outwards relatively to such a plate portion.

As is shown in FIGS. 1b and 2b, some hinge plates 12, 22 and some transverse ribs 19, 22 are shaped such that they extend between the transverse ribs 18', 18", 28', 28" to the bottom surface of the module, while other hinge plates and transverse ribs extend between them only in the vicinity of the top side of these transverse ribs. In this manner, recesses are formed between the hinge plates and/or transverse ribs for receiving the teeth of the drive sprocket wheels.

Figure 6:
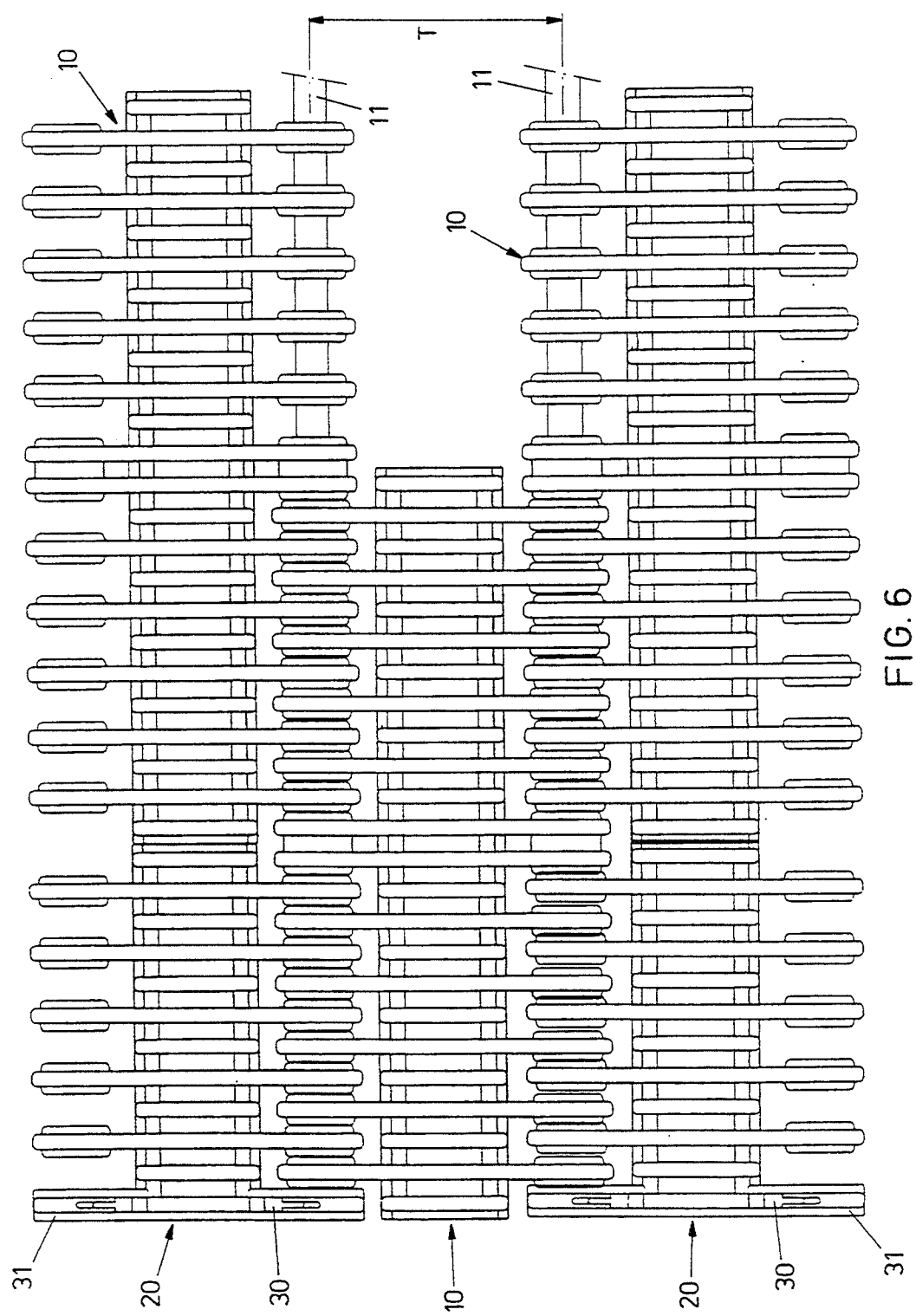
FIG. 6 shows a top plan view of a portion of a conveyor mat composed of modules according to FIGS. 1 and 2.

In further explanation of the invention, FIG. 6 shows a portion of a conveyor mat built up of three first modules 10 and two second or end modules 20. The modules are coupled to each other by means of hinge pins 11. The centre-to-centre distance between two successive hinge pins forms the pitch T of the mat. The two modules have a width which is essentially half that of a first module. It will be understood that a conveyor mat, of which FIG. 6 shows a portion, can have any desired length that is a multiple of the pitch T of a hinge plate 12 or 22 and that the conveyor mat can have a width that is at least the width of a second module and can further be any whole multiple of the width of a second module. The width of a first module can for instance be 6" and that of a second module 3". The pitch of the modules according to FIGS. 1 and 2 is for instance 2". One of the major advantages of the conveyor mat according to the invention is that the entire mat is built up of only two types of modules, these modules further having the advantage that the first modules, viewed in the plane of the drawing of FIG. 6, have no specific front or rear side and that the second modules can be used on both the left-hand and the right-hand side. As a result, the assembly of a mat is extremely simple, with a minimum chance of mistakes.

In the case where a relatively narrow mat is desired, this mat can be built up of two modules exclusively, the mat being built up of one single row of second modules, of which modules the end hinge plates 31 are alternately located on one and on the other lateral side of the mat. The locking members 32 inserted into these end hinge plates always lock the hinge pins for two successive modules on one and on the other side alternately.

As is shown clearly in FIG. 6, the lateral side of the conveyor mat, which is formed by the successive first and second modules is completely flat without laterally projecting parts. This does not only offer the possibility of forming, by means of several mats juxtaposed breadthwise driven at the same speed, one large conveying surface without any irregularity in the pattern of raised ribs which collectively form the bearing surface for products, but also of driving the juxtaposed mats at different speeds, without the chance of the lateral sides catching onto each other or obstructing each other's progress.

Figure 4:
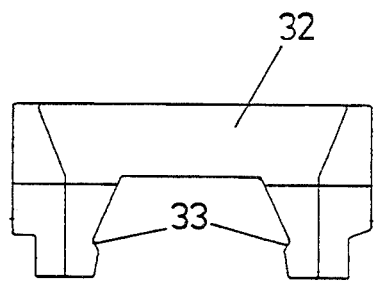
FIG. 4 shows a side view of a locking member for two hinge pins.

The end hinge plate 31, in a second module intended for forming the lateral side of the conveyor mat, has a shape generally corresponding to that of the other hinge plates, but has at least on the outer side an entirely flat side face 35. The end hinge plate 31 has a slot-shaped opening 30, formed in the face thereof, intended for accommodating the locking member 32 shown in side view in FIG. 4, which locking member has substantially an n-shape, the legs of the n being intended for closing the two openings 24 for the hinge pins in a second module in such a manner that these pins cannot slide laterally from the openings during operation.

Figure 5A:
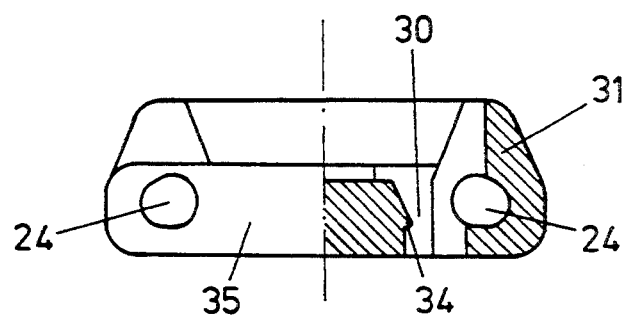
Figure 5B:
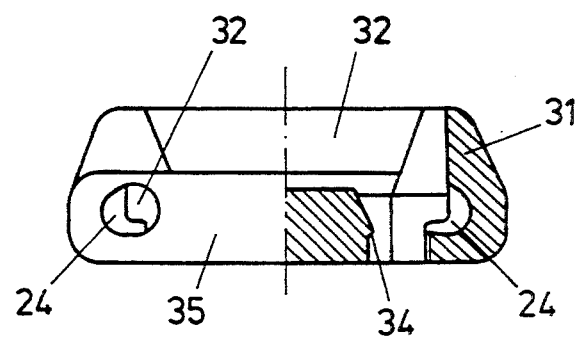
FIG. 5b shows a section taken on the line V—V in FIG. 2a with a locking member according to FIG. 4 disposed in the module.

FIG. 5a shows partly in side view and partly in section the end hinge plate 31 when the locking member 32 has not yet been inserted and FIG. 5b gives a similar view, but now with a locking member 32 inserted into the slot 30. Both legs of the n-shaped locking member 32 are each provided with a receding portion 33, capable of resiliently cooperating with a cam-shaped projecting portion 34 in the slot-shaped opening 30 so as to lock the member 32 in the end hinge plate 31 by means of a click connection. When them at is disassembled, the member 32 can be removed in a very simple manner, for instance by pushing the member 32 upwards by means of a screw driver, inserted into a hinge loop 24 from the lateral side of the mat or under the middle portion of the locking member 32, and thereby releasing the click connection.

Finally, the shape of the top portion of the locking member 32 and the shape of the top portion of the end hinge plate 31 is preferably chosen to be such that the shape of the top side of the hinge plate 31, with a member 32 inserted therein, completely identical, lengthwise as well as breadthwise, to the shape of the top side of the other hinge plates 22, so that the bearing surface of the mat has a completely regular structure, also in the case where several mats are provided side by side.

The transverse ribs 18' and 18" of the first modules have such a width that the ends of the ribs, as shown in FIG. 6, lie in one plane with the side faces 35 of the second modules. Preferably, the ends of the ribs 18' and 18" on both lateral sides of a module are also interconnected by a longitudinal rib 19, ensuring that the end of a first module at the lateral side of the mat is also as flat as possible.

Preferably, also the transverse ribs 28' and 28" of a second module are interconnected at the side facing away from the lateral side of the mat by a longitudinal rib 29.

Due to the relatively large width through which the ribs 18' and 18" extend at the lateral sides of a first module in the first embodiment of the mat according to the invention, which is necessary in order to realize the flat lateral side of the mat, a large interspace is formed between, respectively, the first and the last hinge plate of the adjacent modules in adjacent modules in the width direction of the mat. However, in this embodiment of the mat according to the invention, this problem is solved in that the middle hinge plate of a first module has a double width.

Figure 7:
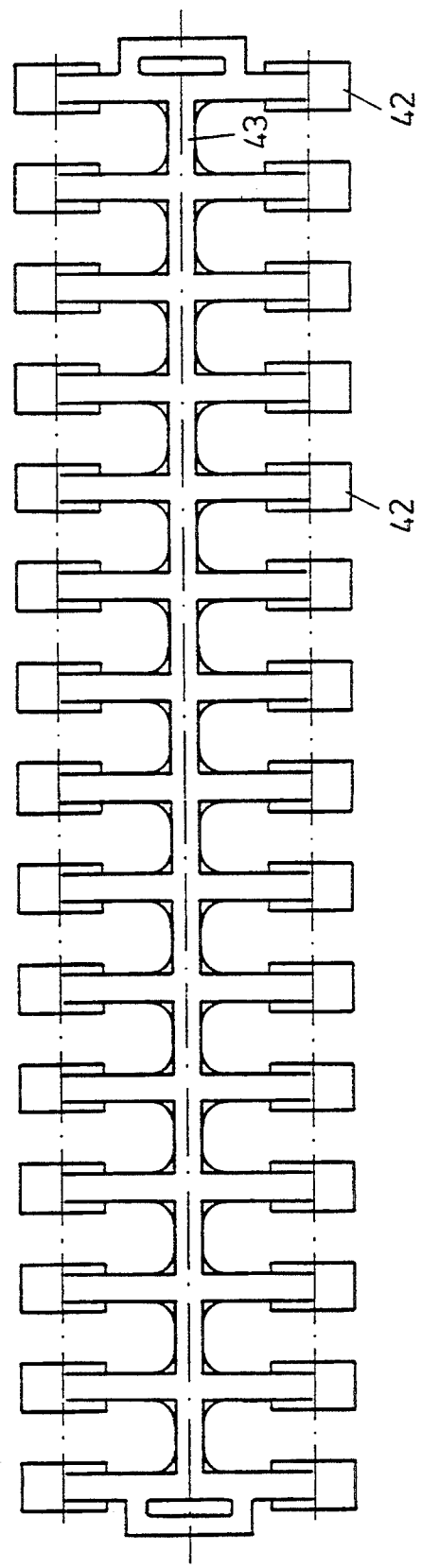
FIG. 7 shows a top plan view of a first module for a second embodiment of the conveyor mat according to the invention.
Figure 8:
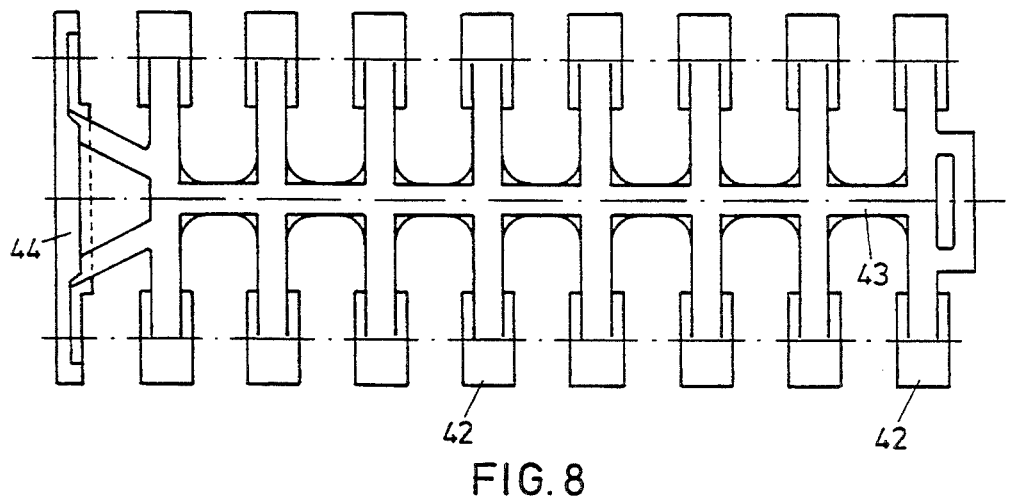
FIG. 8 shows a top plan view of a second module for a second embodiment of the conveyor mat according to the invention.
Figure 9:
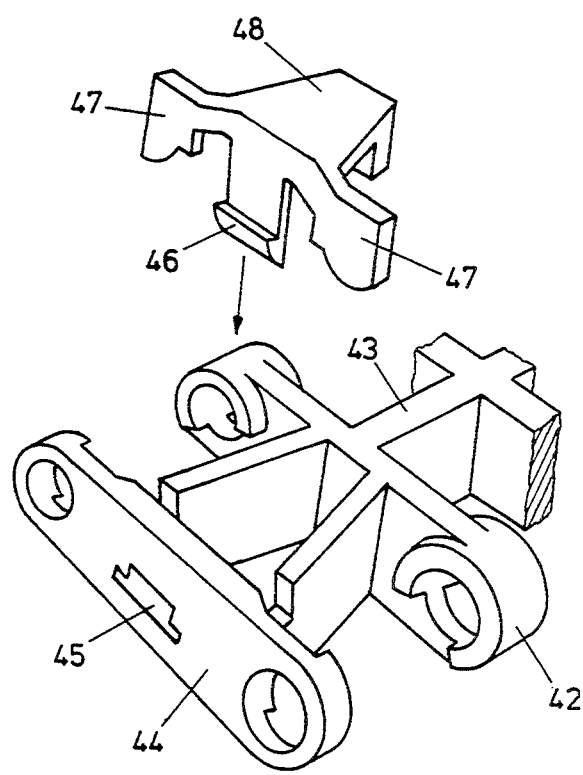
FIG. 9 shows a perspective view of an end portion of the module according to FIG. 8, with the end hinge plate thereof and the locking member for the hinge pins that can be fitted into this plate.

FIGS. 7 and 8 respectively show the bottom side of a first and a second module for a second exemplary embodiment of the conveyor mat according to the invention. In principle, this mat is intended to have a smaller pitch, for instance 1", than the mat according to the first embodiment. The modules of this mat are built up of hinge plates 42 coupled by means of a single transverse rib 43. In this exemplary embodiment, the mat is of the "flush grid" type. However, the mat can also be of the "raised rib" or "flat top" type, without the necessity of modifying the basic structure of the modules for that purpose. Because in this embodiment the end hinge plates 44 of the second modules on the lateral side of the mat have no thickened hinge loops, all hinge plates 42 of both the first and the second modules, with the exception of the above-mentioned end hinge plates, may have the same width, while a flat lateral side is still ensured on both sides of the mat. As shown in FIG. 9, the end hinge plate 44 of the second module has an opening 45 in line with the transverse rib 43, which opening can cooperate with a hook-shaped member 46 mounted on a locking member 48, having an M-shape in side view, with the outer legs of the "M" forming plate-shaped locking members 47 for the hinge pins by means of which the modules can be coupled.

It will be understood that in addition to the examples described hereinabove, other embodiments of modules for conveyor mats are possible within the scope of the invention as described in the claims.

We claim:

1. A conveyor mat built up of first and second modules, made in one piece of synthetic material, the width of the first modules being substantially twice the width of the second modules, with the modules, viewed in the longitudinal direction of the mat, being staggered, each module consisting of a plurality of substantially equally spaced-apart hinge plates, each extending over substantially the entire length of the module and each having hinge loops at the two ends thereof, the hinge plates of a module being coupled by means of at least one transverse rib disposed between the two ends of the hinge plates, the ends of the hinge plates being disposed at a longitudinal side of a module between the ends of the hinge plates of an adjacent module in the longitudinal direction of the mat, the hinge loops of the two modules being substantially in alignment and coupled to each other by means of a hinge pin extending through the hinge loops, there being provided means for locking the hinge pin relatively to the modules, characterized in that the second modules are located exclusively on the two lateral sides of the conveyor mat, a first module always being disposed between two consecutive second modules in the longitudinal direction of the mat, that the end hinge plate disposed at the lateral side of the mat in each second module comprises means for locking the two hinge pins that couple said second module to both first modules adjoining in the longitudinal direction of the mat, and that the first and second modules have such a width that at the lateral sides of the mat, the end faces of the first and second modules are substantially in line.

2. A conveyor mat according to claim 1, characterized in that each first module has an odd number of hinge plates and the middle hinge plate of a first module is designed as a double hinge plate, which is substantially twice as wide as the other hinge plates of the first and second modules.

3. A conveyor mat according to claim 1, characterized in that the hinge plates of a module are coupled to each other by two spaced-apart transverse ribs extending parallel, and that each hinge plate comprises a first plate-shaped part, extending upwards in the plane of said hinge plate over substantially the entire length thereof, with the top sides of the first plate-shaped parts forming a conveying surface, and that on both sides of each hinge plate, with the exception of the end hinge plate of the second modules at the lateral side of the mat, a second plate-shaped part is provided extending parallel to the first plate-shaped part of said hinge plate over substantially the distance between the two ribs and coupled to both ribs of the module and whose top side lies substantially in one plane with the top sides of the first plate-shaped parts.

4. A conveyor mat according to claim 1, characterized in that the hinge plates of a module are coupled to each other by two spaced-apart transverse ribs extending parallel, and that on both sides of each hinge plate, with the exception of the end hinge plate of the second module at the lateral side of the mat, there is provided a longitudinal rib extending parallel to the hinge plates and interconnecting the transverse ribs of a module.

5. A conveyor mat according to claim 3, characterized in that some of the hinge plates and some of the second plate-shaped parts extend to the bottom face of the module, while other hinge plates and second plate-shaped parts only extend in the vicinity of the top side of the transverse ribs, in such a manner that openings are formed for receiving the teeth of a sprocket wheel.

6. A conveyor mat according to claim 4, characterized in that some of the hinge plates and some of the longitudinal ribs extend to the bottom face of the module, while other hinge plates and longitudinal ribs only extend in the vicinity of the top side of the transverse ribs, in such a manner that openings are formed for receiving the teeth of a sprocket wheel.

7. A conveyor mat according to claim 5, characterized in that the longitudinal ribs or second plate-shaped parts at the transverse end of a first or second module extend to the bottom face of said module.

8. A conveyor mat according to claim 1, characterized in that the means for locking the two hinge pins extending through a second module consist of two plate-shaped locking members, each having been inserted into a slot or recess extending in the end hinge plate of the second module at the lateral side of the mat transversely to each of the two hinge pins.

9. A conveyor mat according to claim 8, characterized in that the plate-shaped members are interconnected to form an M-shaped locking element, the middle leg of said element comprising a member for being fixed detachably by clicking it in an opening formed between the two hinge loops in the end hinge plate at the side thereof facing away from the lateral side of the mat.

10. A conveyor mat according to claim 8, characterized in that the two plate-shaped locking members belonging to a single second module are interconnected to form an n-shaped part, the top side of the n-shaped part being part of the conveying face of the mat, and that each of the plate-shaped members comprises means for being fixed detachably by clicking it on a longitudinal end of a slot.

11. A conveyor mat according to claim 1, the mat being built up exclusively of one single row of modules, the end hinge plates of said modules being alternately disposed at one end at the other lateral side of the mat.

12. A conveyor mat according to claim 2, characterized in that the hinge plates of a module are coupled to each other by two spaced-apart transverse ribs extending parallel, and that each hinge plate comprises a first plate-shaped part, extending upwards in the plane of said hinge plate over substantially the entire length thereof, with the top sides of the first plate-shaped parts forming a conveying surface, and that on both sides of each hinge plate, with the exception of the end hinge plate of the second modules at the lateral side of the mat, a second plate-shaped part is provided extending parallel to the first plate-shaped part of said hinge plate over substantially the distance between the two ribs and coupled to both ribs of the module and whose top side lies substantially in one plane with the top sides of the first plate-shaped parts.

13. A conveyor mat according to claim 2, characterized in that the hinge plates of a module are coupled to each other by two spaced-apart transverse ribs extending parallel, and that on both sides of each hinge plate, with the exception of the end hinge plate of the second module at the lateral side of the mat, there is provided a longitudinal rib extending parallel to the hinge plates and interconnecting the transverse ribs of a module.

14. A conveyor mat according to claim 6, characterized in that the longitudinal ribs or second plate-shaped parts at the transverse end of a first or second module extend to the bottom face of said module.

15. A conveyor mat according to claim 12, characterized in that some of the hinge plates and some of the second plate-shaped parts extend to the bottom face of the module, while other hinge plates and second plate-shaped parts only extend in the vicinity of the top side of the transverse ribs, in such a manner that openings are formed for receiving the teeth of a sprocket wheel.

16. A conveyor mat according to claim 13, characterized in that some of the hinge plates and some of the longitudinal ribs extend to the bottom face of the module, while other hinge plates and longitudinal ribs only extend in the vicinity of the top side of the transverse ribs, in such a manner that openings are formed for receiving the teeth of a sprocket wheel.

17. A conveyor mat according to claim 15, characterized in that the longitudinal ribs or second plate-shaped parts at the transverse end of a first or second module extend to the bottom face of said module.

18. A module for use in a conveyer mat comprising odd number of substantially equally spaced-apart hinge plates and a middle hinge plate designed as a double hinge plate which is substantially twice as wide as other hinge plates, each of the hinge plates extending over substantially the entire length of the module and each having hinge loops at the two ends thereof, the hinge plates of a module being coupled by means of at least one transverse rib disposed between the two ends of the hinge plates.

19. The module according to claim 18 wherein the hinge plates of a module are coupled to each other by two spaced-apart transverse ribs extending parallel, and wherein each hinge plate comprises a first plate-shaped part, extending upwards in the plane of said hinge plate over substantially the entire length thereof, with the top sides of the first plate shaped parts forming a conveying surface, and wherein on both sides of each hinge plate, a second plate-shaped part is provided extending parallel to the first plate-shaped part of said hinge plate over substantially the distance between the two ribs and coupled to both ribs of the module and whose top side lies substantially in one plane with the top sides of the first plate-shaped parts.

20. The module according to claim 19 wherein some of the hinge plates and some of the second plate-shaped parts extend to the bottom face of the module, while other hinge plates and second plate-shaped parts only extend in the vicinity of the top side of the transverse ribs, in such a manner that openings are formed for receiving the teeth of a sprocket wheel.

21. The module according to claim 18 wherein the hinge plates of a module are coupled to each other by two spaced-apart transverse ribs extending parallel, and wherein on both sides of each hinge plate, there is provided a longitudinal rib extending parallel to the hinge plates and interconnecting the transverse ribs of a module.

22. The module according to claim 21 wherein some of the hinge plates and some of the longitudinal ribs extend to the bottom face of the module, while other hinge plates and longitudinal ribs only extend in the vicinity of the top side of the transverse ribs, in such a manner that openings are formed for receiving the teeth of a sprocket wheel.

* * * * *